United States Patent [19]

Frase

[11] Patent Number: 4,819,737
[45] Date of Patent: Apr. 11, 1989

[54] ROW CROP CULTIVATOR

[75] Inventor: Roland J. Frase, Roselle, Ill.

[73] Assignee: J. I. Case Company, Racine, Wis.

[21] Appl. No.: 100,733

[22] Filed: Sep. 24, 1987

[51] Int. Cl.$^4$ ............... A01B 39/08; A01B 39/14
[52] U.S. Cl. ................. 172/156; 172/624.5; 172/166; 172/744; 172/395; 172/310; 280/43
[58] Field of Search ............ 172/624.5, 310, 395, 172/415, 416, 417, 418, 78, 421, 166, 151, 736, 744; 280/43

[56] References Cited

U.S. PATENT DOCUMENTS

| | | | |
|---|---|---|---|
| 2,899,776 | 8/1959 | Arnold | 172/624.5 |
| 3,921,726 | 11/1975 | Connor | 172/624.5 |
| 3,951,213 | 4/1976 | van der Lely | 172/78 X |
| 3,970,012 | 7/1976 | Jones, Sr. | 111/6 |
| 4,289,081 | 9/1981 | Koronka | 111/88 |
| 4,331,205 | 5/1982 | Sorenson | 172/538 |
| 4,356,780 | 11/1982 | Bauman | 111/85 |
| 4,373,456 | 2/1983 | Westerfield | 111/88 |
| 4,398,478 | 8/1983 | Frase | 111/85 |
| 4,423,788 | 1/1984 | Robinson, Jr. | 172/427 |
| 4,461,355 | 7/1984 | Peterson | 172/156 |
| 4,509,603 | 4/1985 | Adams | 172/427 |
| 4,579,179 | 4/1986 | Vachon | 172/624.5 |

Primary Examiner—Richard J. Johnson
Assistant Examiner—Jeffrey L. Thompson
Attorney, Agent, or Firm—Dressler, Goldsmith, Shore, Sutker & Milnamow, Ltd.

[57] ABSTRACT

A row crop cultivator particularly adapted for ridge-hill and minimum tillage farming conditions. The cultivator carries a number of tools including spaced hilling disks, a coulter wheel and a sweep for effectively pitching soil and cutting crop residues and weeds between the planted rows. A gauge wheel assembly is provided for controlling the depth of penetration of the tools into the soil. The gauge wheel assembly includes a pair of elongated arms pivotally connected between a pair of parallel plates on the cultivator frame. Series of vertically spaced adjustment holes are formed in the plates and a pin member is selectively insertable in any aligned pair of holes to limit pivotal movement of the gauge wheel arms the elevation of the gauge wheel relative to the frame. The gauge wheel adjustments are easily made by hand in the field without the use of tools.

10 Claims, 3 Drawing Sheets

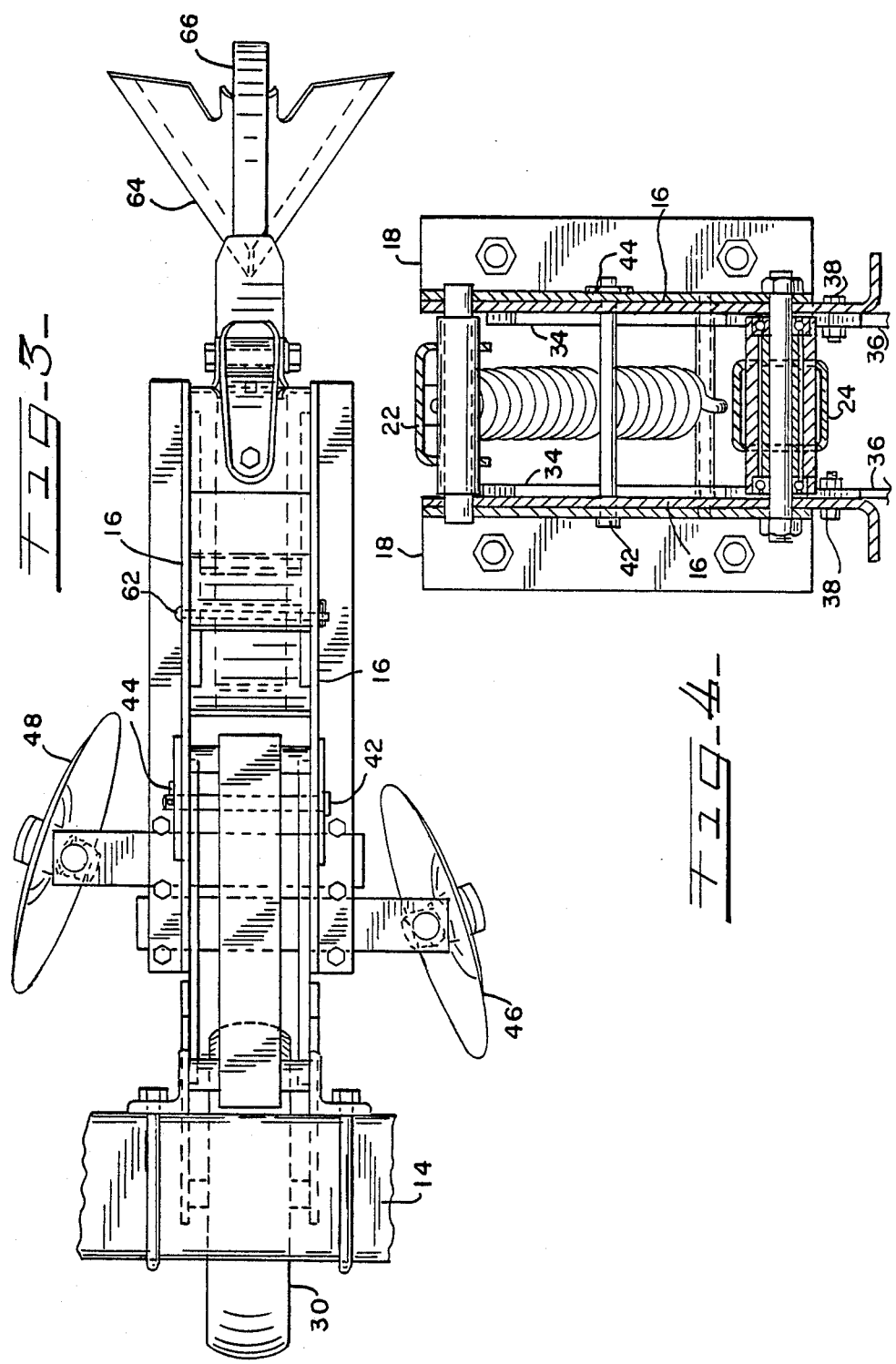

ROW CROP CULTIVATOR

TECHNICAL FIELD

This invention relates generally to agricultural equipment, and more particularly, to a row crop cultivator designed for use in ridge-till and minimum tillage farming operations and having a novel arrangement permitting ready field adjustments to accommodate varying soil and crop conditions.

BACKGROUND OF THE INVENTION

Efficient and successful farming operations require careful cultivation of the soil between the rows of planted or growing crops. For example, the soil must be aerated or rearranged and residues from prior crops remaining in the field cut or mulched. Weed population must be controlled by uprooting or cutting beneath the ground level. Such cultivation procedures become particularly important in ridge-till and minimum tillage farming. In ridge-till farming, seeds are planted in rows of soil ridges that leave depressions or valleys between the ridges. With normal weathering, particularly under rainy or muddy conditions, soil from the ridges tends to wash down into the valleys and must be piled back to the ridges. In minimum tillage farming involving plants with light root systems, such as soybeans, the rows of seeds are planted without deep plowing or tillage so that the weeding and the removal of prior crop residues are important.

A variety of agricultural implements have heretofore been provided for carrying out cultivating procedures of the type alluded to. In general, such implements comprise an elongated, transverse frame or tool bar, adapted to be towed by a tractor or the like. Mounted from the frame are a plurality of similar earth-working tools, such as rotating harrow disks, coulters, tines, chisels, spikes, shovels, or the like. The tools are appropriately spaced on the frame so that the cultivator implement can be drawn through the field and the tools do their intended work on the soil between the rows of seeds or growing crops.

Frequently, the earth-working tools comprise individual units which are ganged on an elongated frame. Since field and soil conditions are constantly changing, provision must be made for maintaining relatively constant operating depth control of the individual cultivator tool units. For this purpose, it is known to provide individual cultivator units with spring-loaded parallel linkage support arrangements that automatically maintain tool depth control in response to varying field conditions. Examples of such parallel linkage arrangements are shown in U.S. Pat. Nos. 4,356,780; 4,373,456; 4,398,478 and 4,423,788, for use in connection with a somewhat related but different implement, a seed planter.

The cited patents give some indication of the difficulty of dealing with the depth control problem as it relates to the isolated seed planting operation. Depth control becomes an even more complex problem when all of the variables relating to cultivating prior crop residues and weeds are added to those of mere soil conditions. Typically, a ridge-hill or minimum tillage cultivator unit will comprise a number of different tools, such as soil movers, coulters and sweeps, so that the combined functions of those tools can be utilized during a single pass through the field. Many tool and depth control adjustments are required to be made in the field. With prior known cultivators, such field adjustments were difficult to make, time-consuming and frequently required the use of tools.

Thus, there exists a need for a row crop cultivator that is capable of performing a number of cultivator functions and yet is easily and readily adjustable as field and crop conditions dictate. Desirably, the adjustments should not require the use of tools or wrenches, but should yet provide a broad and substantial number of incremental adjustments.

SUMMARY OF THE INVENTION

The present invention provides a row crop cultivator that is easily and broadly adjustable to accommodate varying field conditions and yet requires no tools or measurements to make such adjustments.

Briefly, the invention comprises a cultivator unit that combines the multiple functions of hilling or pitching soil, cutting weeds or crop residues and sweeping the cut weeds or residues. The cultivator unit is equipped with a spring-urged parallel linkage support arrangement for automatically maintaining substantially constant tool pressure and operating depth control between ganged units.

More particularly, the tools of the multi-function cultivator unit comprise a pair of hilling disks, which are adjustable in height and angle, for cutting weeds near the plant rows and pitching soil between the rows or forming ridges. A central coulter wheel is positioned behind the disk wheels for further cutting crop residues or weeds. A sweep is positioned behind the couter wheel and acts further on the cut residues and/or formed ridges. Operating depth of the tool is controlled in part by a gauge wheel positioned forwardly of the hilling disks.

The gauge wheel is pivotally mounted from the cultivator by a gauge wheel frame which includes a pair of long, rigid arms. The gauge wheel frame is pivotally mounted from a pair of structural cultivator plates that are formed with a series of aligned pairs of holes. A headed pin is readily and removably positionable in a selected pair of holes and cooperates with the upper extensions of the gauge wheel frame arms to position the gauge wheel for maintaining the selected working depth for the tools. The coulter wheel is also provided with an aligned holes-removable pin arrangement for independently adjusting the operating depth of the coulter to match field conditions. The headed pins are readily removable and insertable by hand to provide a wide variety of depth control settings for the cultivator operations.

Numerous other features and advantages of the present invention will become readily apparent from the following detailed description, the accompanying drawings, and the appended claims.

BRIEF DESCRIPTION OF THE DRAWINGS

In the accompanying drawings forming a part of the specification, and in which like numerals are employed to designate like parts throughout.

FIG. 3 is a top plan view; and

FIG. 4 is a sectional view taken on the plane of line 4—4 of FIG. 2.

DETAILED DESCRIPTION

Figure 1:
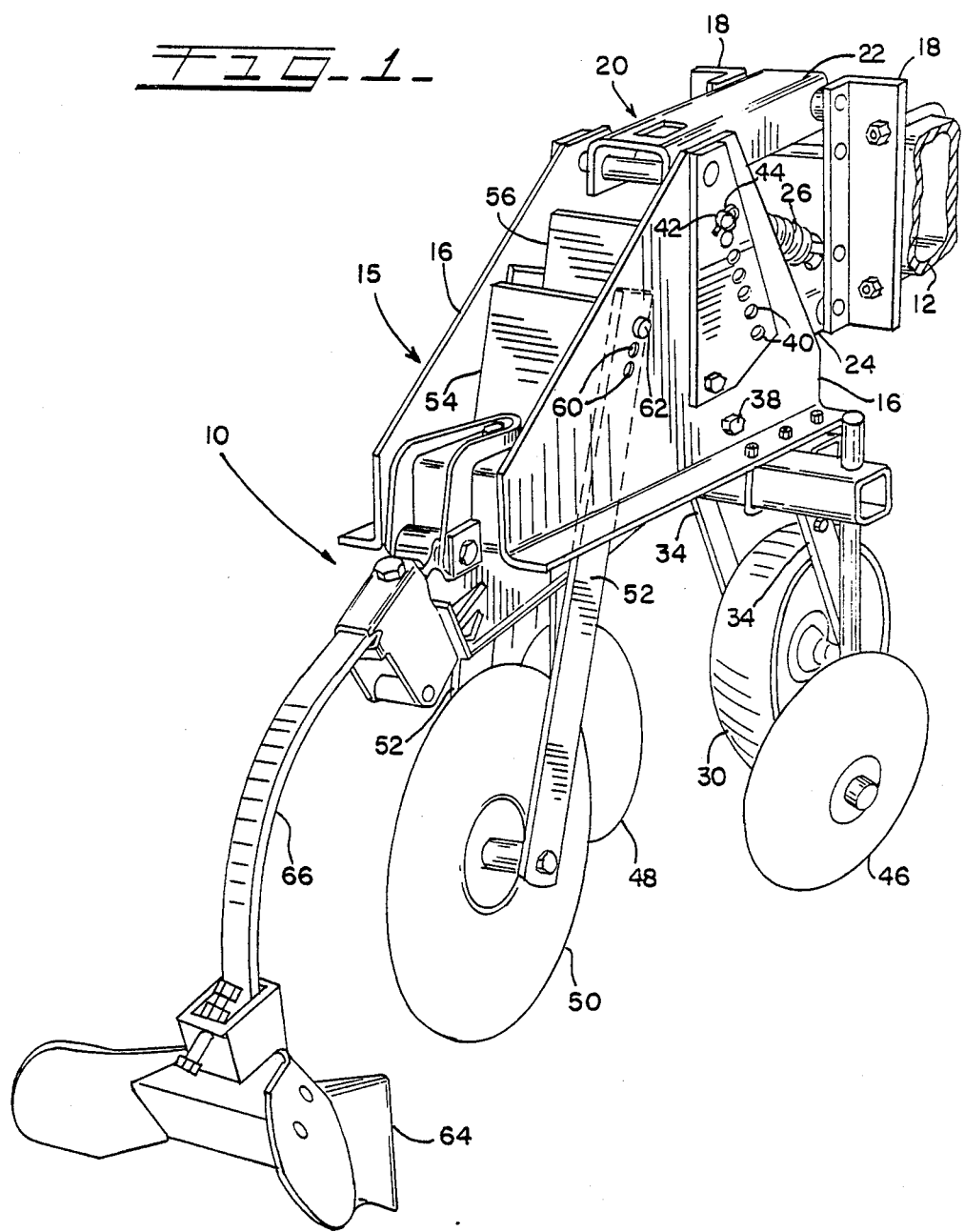
FIG. 1 is a right side, perspective view of a row crop cultivator embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring with greater particularity to the Figures of the drawings, it will be seen that the reference numeral 10 indicates generally a row crop cultivator embodying the principles of the invention. Cultivator 10 comprises a self-contained implement and a number of such units typically are operationally connected to a tool bar, shown fragmentarily at 12, to be drawn behind a mobile vehicle such as a tractor through towing means 14.

Cultivator 10 comprises a structural frame 15 having spaced, vertical side plates 16, 16. The plates 16 are mounted to the tool bar 12 through a pair of mounting brackets 18, 18 and a pivotal parallel linkage arrangement 20 which includes upper and lower links 22 and 24 and a biasing spring 26 connected therebetween. The parallel linkage arrangement 20 is generally of the type disclosed in the previously cited patents and serves to equalize the operating pressure and depth between the individual cultivator 10 which are ganged on the tool bar.

A gauge wheel 30 is pivotally mounted to the plates 16 by means of a gauge wheel assembly 32 to extend forwardly of the cultivator 10. The gauge wheel assembly 32 comprises a pair of rigid, elongated arms 34, 34 extending upwardly between the plates 16. Each of the arms 34 comprises a medial projection or pivot plate 36 whereby the arms are pivotally connected to the plates 16 as at 38 (see FIGS. 2 and 4).

Figure 2:
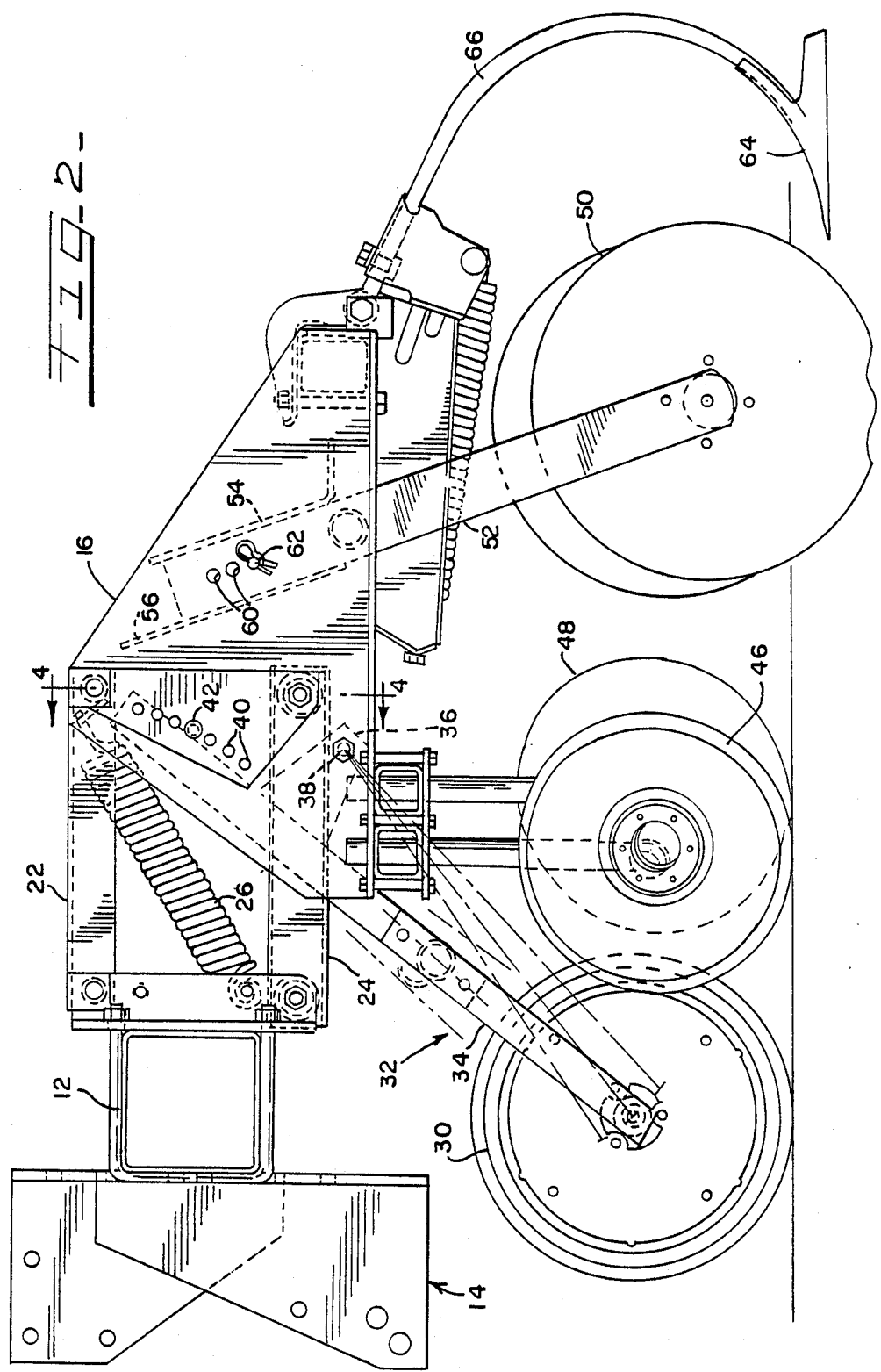
FIG. 2 is a left side elevational view thereof.

A series of adjustment holes 40 is formed in each of the plates 16 so that the holes in the respective plates are in opposed, aligned relationship. A headed pin 42 is positionable in any of the paired holes 40 and is retained by ready release means, such as a quick attach pin 44 through an opening in the free end of the pin. An operationally positioned pin 42 functions to limit, in varying degrees, the pivotal movement of the arms 34 about the pivots 38 as the upper ends of said arms bear against the pin. It will thus be seen that the gauge wheel 30 may adjustably set to adjust the working depth of the cultivator tools to any desired depth, such as the shallowest depth as shown in FIG. 1, to an intermediate depth as shown in FIGURE 2, or the deepest setting which would correspond to the bottommost pair of holes 40. While any number and spacing of the adjustment holes 40 may be provided, in the embodiment illustrated, there are 7 pairs of holes which provide approximately one-half inch increments at the gauge wheel 30.

Concave hilling disks 46 and 48 are dependingly mounted from the plates 16 behind the gauge wheel 30 and on opposite sides of said plates. The disks 46 and 48 preferably are adjustable in height, angle and lateral spacing therebetween to suit the particular field being cultivated.

A coulter wheel 50 is mounted from the plates 16 and behind the hilling disks 46 and 48. The coulter wheel 50 is carried by a coulter frame comprising a pair of arms 52, 52 telescopically positioned in fixed guideway plates 54 and 56 between the plates 16. A pair of pin-receiving holes are formed in the upper portions of the arms 52, and pairs of coulter depth adjustment holes 60 are formed in the plates 16. A headed pin 62 positioned through any selected pair of holes 60 thereby serves to adjust the operating depth of the coulter wheel 50. In the embodiment illustrated, there are three adjustment holes 60 in the plates 16 to provide coulter wheel adjustment increments of approximately 1 inch, although other numbers and spacing could also be employed.

A sweep such as 64 is mounted from the plates 16 rearwardly of the coulter wheel 50 by suitable means such as a spring steel shank 66. As suggested by FIG. 2 of the drawings, the various tools of the cultivator are intended to operate at different soil depths, but all responsive to the setting of the gauge wheel 30. Thus, the hilling disks 46 and 48 function near the soil surface to cut weeds near the plant rows and pitch soil between the rows or form soil ridges between said disks. Coulter wheel 50 functions at the deepest level to cut crop residues and thereby prevent hairpinning around the sweep shank 66. The sweep 64 operates at an intermediate level below the residue depth, or in the formed soil ridges, to cut weeds between the plant rows. Thus, effective cultivation between the plant rows is assured.

The ease with which the described adjustments may be made should now be appreciated. Cultivator 10 is raised off the ground high enough to permit the guage wheel 30 to pivot downwardly in which case the arms 34 clear all adjustment holes 40. The headed pin 42 may now be set in any pair of adjustment holes as desired. The manner of adjusting the working depth of the coulter wheel 50 should be equally evident, it being necessary only to position the holes in arms 52 in registry with the selected pair of holes 60 in the plates 16 and insert the pin 62 therethrough.

It will be appreciated from the foregoing detailed description of the invention and illustrative embodiment thereof that numerous variations and modifications may be effected without departing from the true spirit and scope of the novel concept of the principles of the invention.

What is claimed is:

1. A row crop cultivator comprising:
 a frame attachable for towing to a mobile power source;
 a plurality of earth-working tools dependingly mounted from said frame;
 a gauge wheel assembly pivotally mounted to said frame and including a gauge wheel projecting forwardly of said frame, and further including at least one elongated arm pivotally mounted on said frame intermediate the length of said elongated arm; and
 gauge wheel adjustment means on said frame for controlling the pivotal movement of said assembly and the elevation of said gauge wheel relative to the frame and thereby regulating the depth of penetration of said tools into the soil, said gauge wheel adjustment means comprising pin-receiving means defined by said frame, and adjustment pin means selectively positionable in said pin-receiving means so that an upper portion of said elongated arm of said gauge wheel assembly contacts and bears against said pin means to limit the pivotal movement of said elongated arm of said gauge wheel assembly relative to said frame.

2. A row crop cultivator according to claim 1, wherein
 said frame comprises a pair of parallel, substantially vertical plates and said gauge wheel assembly comprises a pair of elongated arms, said arms being pivotally mounted at a point intermediate their length between said plates.

3. A depth control for a towable cultivator having a frame and a plurality of tools mounted on the frame, comprising:
- a gauge wheel means mounted on said frame forwardly of said tools for regulating the depth of penetration into the soil of said tools;
- said gauge wheel means including a gauge wheel rotatably mounted to a gauge wheel assembly and a gauge wheel adjustment arm extending between said gauge wheel assembly and said frame, said gauge wheel adjustment arm pivotally mounted intermediate its length about a substantially horizontal axis to said frame; and
- gauge wheel adjustment means associated with said frame for controlling the elevation of said gauge wheel relative to said frame, said gauge wheel adjustment means including a plurality of vertically spaced depth adjustment holes extending through said frame and a substantially horizontal adjustment pin member selectively positioned through one of said holes such that an upper portion of said gauge wheel adjustment arm contacts said pin member so as to limit pivotal movement of said gauge wheel adjustment arm and thereby maintains said gauge wheel at a selected elevation relative to said frame.

4. The apparatus as defined in claim 3, wherein said frame includes a pair of spaced apart substantially parallel plate members having said depth adjustment holes formed therein in horizontal alignment with one another and said upper portion of said gauge wheel adjustment arm extends between said plate members.

5. The apparatus as defined in claim 4, wherein a pivot plate member projects medially from said gauge wheel adjustment arm, said pivot plate member being pivotably mounted to said plate members.

6. The apparatus as defined in claim 5, wherein said tools comprise a pair of spaced apart hilling disks, a coulter wheel rearwardly of said hilling disks, and a sweep assembly rearwardly of said hilling disks.

7. A row crop cultivator comprising:
- a frame attachable for towing to a mobile power source;
- a plurality of earth-working tools dependingly mounted from said frame;
- a gauge wheel assembly pivotally mounted to said frame and including a gauge wheel projecting forwardly of said frame; and
- gauge wheel adjustment means on said frame for controlling the pivotal movement of said assembly and the elevation of said gauge wheel relative to the frame and thereby regulating the depth of penetration of said tools into the soil,
- said frame comprising a pair of parallel, substantially vertical plates and said gauge wheel assembly comprises a pair of elongated arms, said arms being pivotally mounted at a point intermediate their length between said plates,
- said adjustment means comprising a series of vertically spaced adjustment holes formed in each of said plates and in registry with each other, and a pin member selectively positionable in any pair of said holes so that the upper portion of said arms contacts said pin to limit pivotal movement of said arms.

8. A row crop cultivator comprising:
- a frame attachable for towing to a mobile power source;
- a plurality of earth-working tools dependingly mounted from said frame;
- a gauge wheel assembly pivotally mounted to said frame and including a gauge wheel projecting forwardly of said frame; and
- gauge wheel adjustment means on said frame for controlling the pivotal movement of said assembly and the elevation of said gauge wheel relative to the frame and thereby regulating the depth of penetration of said tools into the soil;
- said frame comprising a pair of parallel, substantially vertical plates and said gauge wheel assembly comprises a pair of elongated arms, said arms being pivotally mounted at a point intermediate their length between said plates;
- said tools comprising a coulter wheel rotatably carried by a pair of elongated coulter wheel arms mounted between said plates, and second adjustment means associated with said plates and coulter wheel arms for controlling the elevation of said coulter wheel relative to the frame.

9. A row crop cultivator according to claim 8, wherein
said second adjustment means comprises a plurality of opposed vertically spaced holes formed in each of said plates in registry with each other, and an adjustment opening in an upper portion of each of said coulter wheel arms and a pin member positionable through said openings and a selected pair of said holes.

10. A row crop cultivator according to claim 8, wherein
said tools comprise a pair of hilling disks forwardly of said coulter wheel and a sweep assembly rearwardly of said coulter wheel.

* * * * *